(No Model.) 2 Sheets—Sheet 1.

W. McILVRID.
PIPE HANGER.

No. 524,603. Patented Aug. 14, 1894.

WITNESSES:
J. A. Kirk
John W. Steward

INVENTOR
William McIlvrid
BY
A. P. Steward
ATTORNEY.

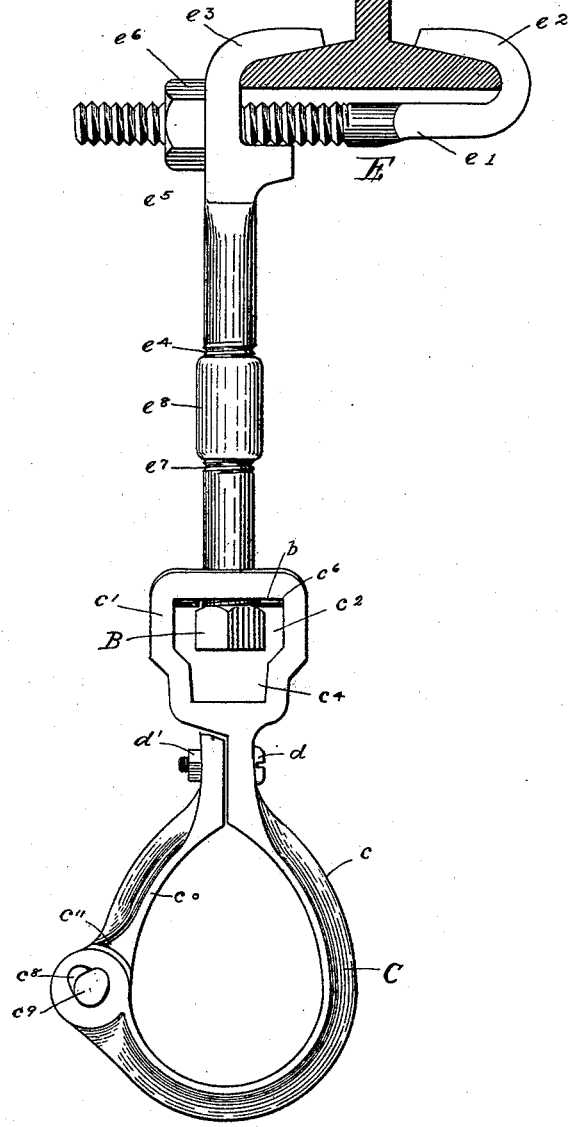
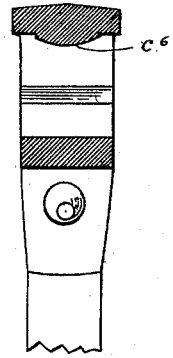

UNITED STATES PATENT OFFICE.

WILLIAM McILVRID, OF JERSEY CITY, NEW JERSEY, ASSIGNOR TO THE A. A. GRIFFING IRON COMPANY, OF SAME PLACE.

PIPE-HANGER.

SPECIFICATION forming part of Letters Patent No. 524,603, dated August 14, 1894.

Application filed June 4, 1894. Serial No. 513,413. (No model.)

*To all whom it may concern:*

Be it known that I, WILLIAM MCILVRID, a citizen of the United States, residing at Jersey City, in the county of Hudson and State of New Jersey, have invented certain new and useful Improvements in Pipe-Hangers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of the invention is to produce a pipe hanger which may be readily secured to and detached from a beam or support of wood, iron or other suitable material; which is susceptible of vertical adjustment; which is flexibly supported so as to admit of longitudinal and other movements of the pipe; which may be opened to receive a pipe, and yet have the movable member of its stirrup firmly secured when closed so as to bear its share of the weight, and which will temporarily support a pipe, as occasion may require, at one side of its normal place of rest.

The invention consists of the devices hereinafter described and claimed whereby the aforesaid object is accomplished.

Figure 4:
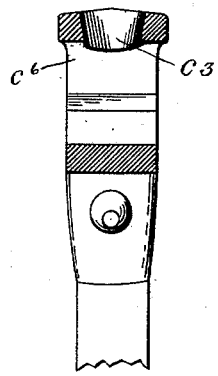
Figure 1:
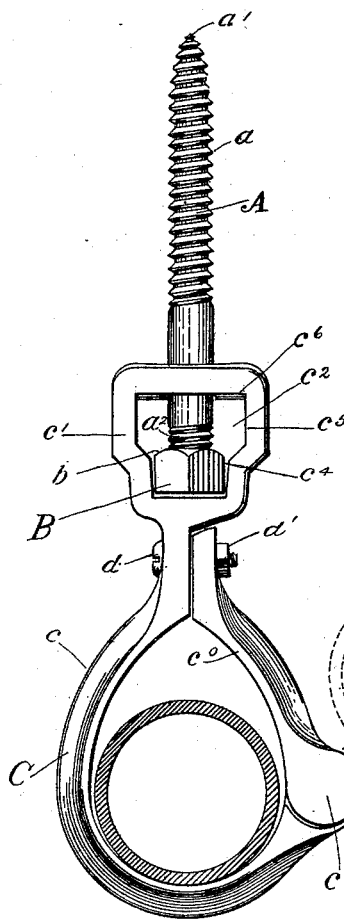
Figure 3:
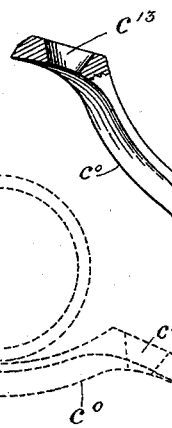
Figure 2:
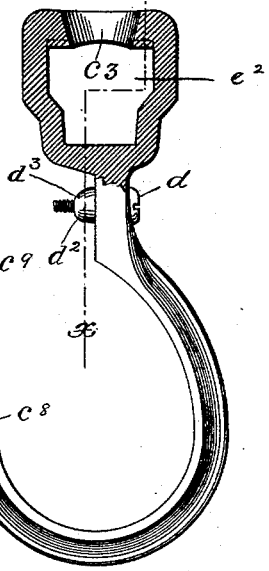

Referring to the drawings which form a part of this specification: Figure 1 represents a view in elevation of the complete hanger, showing in dotted lines a pipe supported out of its normal position by the movable member of the stirrup. Fig. 2 shows, partly in section, the reverse side of a portion of the stirrup of Fig. 1. Fig. 3 shows the movable part of the stirrup detached. Fig. 4 represents a sectional view of the upper portion of the stirrup taken at right angles to the section appearing in Fig. 2. Fig. 5 represents a sectional view taken on the line $x$—$x$ of Fig. 2. Fig. 6 shows a modified form of support for the stirrup, and also a bolt lengthened by the addition of a section coupled thereto.

The hanger of Figs. 1 to 5 inclusive is composed of three principal parts; a bolt A, a nut B, and a stirrup C.

The bolt has, at its upper end, a coarse screw $a$ which terminates in a gimlet point $a'$ whereby it may be readily screwed into a beam, and is provided at its lower end with a fine screw $a^2$ adapted to receive the nut B.

The nut B has a somewhat convex upper surface $b$ that permits the stirrup, which it supports to slightly swing in any direction.

The stirrup C is made in two parts, $c$ and $c^0$, which are adapted to inclose a pipe, the part $c$ being in hook form at its lower end so as to constitute a socket in which the pipe may rest. Its upper end is expanded to form a shank $c'$ and is provided with a socket $c^2$ to receive the nut B, as well as with a tapering hole $c^3$ through which the bolt A may loosely pass.

The socket $c^2$ is open at two sides and is so shaped and proportioned as to form at its bottom a wrench socket $c^4$ for the nut B, although its top $c^5$ is of sufficient width to permit the nut to freely turn.

A rib $c^6$ crosses the upper internal face of the socket $c^2$, but is interrupted at the middle by the hole $c^3$. This rib permits the stirrup to rock freely on the nut, so as to compensate for the expansive thrust of the pipe which the stirrup supports.

The part $c^0$ of the stirrup is interlocked with the part $c$ by means of a non-circular hole $c^8$, in one part of the stirrup, and a pintle $c^9$, having a lug $c^{10}$ conforming in shape to the hole $c^8$, in the other part of the stirrup, which together constitute a hinged joint $c^7$.

The movable member $c^0$ of the stirrup, may swing upon the fixed part thereof sufficiently far to admit a pipe; but its downward motion is limited by the contact of the faces $c^{11}$ and $c^{12}$ which arrests it at such point that it will remain in a substantially horizontal position and serve as a temporary support for the pipe, it being desirable at times to rest a line of piping in a position somewhat at one side of its normal position. Fig. 1 clearly illustrates the utility of this feature, the position of a pipe that has been lifted out of the hooked part of the stirrup and placed upon the part $c^0$ being represented by dotted lines.

The hole $c^8$ and the lug $c^{10}$ are so situated that the member $c^0$ cannot be detached when it is in either its uppermost or its lowermost position; but the two parts may be readily detached when the said member is in an intermediate position, for then the hole and lug are in coincidence.

The part $c^0$ is secured in place by a screw $d$ cast in the upper portion of the fixed part of the hanger, upon which is passed a nut $d'$. Around the screw is cast a boss $d^2$, which is beveled on its upper side $d^3$. In the upper end of the part $c^0$ is a tapering hole $c^{13}$ through which the screw $d$ extends when the part $c^0$ has assumed its normal position. The beveled portion or side $d^3$ acts, when the nut $d'$ is screwed home, as a cam to lift the part $c^0$ and exert upon it a tension that will cause it to bear its part of the load and not leave the whole weight of the pipe to be sustained by the part $c$, and that it will also hold it firmly in position and prevent rattling at the hinged joint.

When the hanger is to be secured to a beam the bolt, nut and stirrup are properly assembled, the stirrup is grasped by the hand and the gimlet point of the bolt crowded into the wood.

The upward pressure upon the stirrup holds the nut in the wrench socket $c^4$ and the stirrup C thus becomes, for the time being, a handle for the bolt. After the bolt is screwed into the beam far enough the hand is removed from the stirrup which then falls to such position that the nut B is in the wide upper portion $c^2$ of the socket and ready to perform its usual function of supporting the stirrup so that it may swing freely as indicated above.

The wrench socket is also useful as a means for removing the nut from the bolt after the latter has been secured in place, as well as for screwing the nut upon a bolt, or equivalent device, that is already attached to a beam.

The bolt A is, as will be seen, a differential screw, and by turning it one way or the other by means of pipe tongs the hanger may be vertically adjusted, within narrow limits, such adjustment being dependent upon the fact of a difference in the pitch of the respective screw-threads upon its ends.

In Fig. 6 is shown a device for attaching a hanger to a beam of iron, or other material that a screw cannot penetrate. This device is a clamp E consisting of three parts; a somewhat long screw-threaded bolt $e'$, having a hooked end $e^2$ which constitutes one jaw, a jaw $e^3$ provided with a hole $e^5$ through which extends the bolt $e'$ and having a pendent screw-threaded portion $e^4$, and a nut $e^6$ which is adapted to screw upon the bolt $e'$ and draw the two jaws together, so that they may grasp a beam in the manner illustrated. The pendent screw-threaded portion $e^4$ is really a bolt, and upon it the nut B is to be screwed just as it is to be screwed upon the bolt A illustrated in Fig. 1. The advantage of making the bolt a part of one of the jaws lies in the simplicity of construction thus secured, for heretofore, so far as I am aware, the bolt has been made separate from the clamp, and means for securing the two parts together was necessary.

The threads upon the lower ends of the bolts A and $e^4$ are of standard size, the object being to secure to the bolts additional lengths $e^7$ by means of ordinary standard couplings $e^8$ so that the hanger may be lengthened.

It is evident that the part of my invention referred to by the term "wrench socket" can be embodied in any known pipe hanger in which there are opposite walls (similar to those which form the side of the socket $c^2$) which may be so formed as to be nearer together at their lower portions than they are at their upper portions, and to thus fit the nut or head of a bolt the function of which is to support the hanger.

Having fully described my invention, what I claim as new, and desire to secure by Letters Patent, is—

1. In a pipe hanger the combination of a bolt provided with a head or nut at its lower end and adapted to be screwed into a beam or other support at its upper end, and a stirrup having opposing parts or walls so spaced at their lower ends as to engage the head or nut and thus constitute a wrench socket, and being separated at their upper ends sufficiently far to permit the nut to freely turn, substantially as described.

2. The combination of a stirrup provided with a socket at its upper end, the said socket having a hole in its top and being wider at its upper portion than it is at its lower portion, a bolt extending through said hole and having upon its upper end a screw for engaging a beam or similar support, and upon its lower end a head or nut of substantially the same width as and adapted to fit the bottom of the socket substantially as described.

3. A pipe hanger having a wrench socket at its upper end provided with a hole in its top, a bolt extending through said hole, the said bolt being provided at its upper end with a coarse screw adapted to enter a beam or similar support, and at its lower end with a fine screw engaging a portion of the hanger and a nut on said lower end and situated within the socket, substantially as described.

4. The combination with a stirrup having a wrench socket at its upper end provided with a hole in its top and with a rib on the under side of said top, of a bolt or rod extending through said hole and having a nut on its under side adapted to engage said rib, substantially as described.

5. The combination with a stirrup having a wrench socket at its upper end provided with a tapering hole in its top and with a rib on the under side of said top, of a bolt or rod extending through said hole and having a nut on its under side adapted to engage said rib, substantially as described.

6. A pipe hanger stirrup consisting of two hinged members, the one being provided with a lug beveled upon its upper side and having at its end a securing device, and the other having a hole through which the said lug extends when the parts are locked, substantially as described.

7. A pipe hanger stirrup consisting of two hinged members the one being provided with a lug beveled upon its upper side and having at its end a screw and nut, and the other having a hole into which the said lug extends when the parts are locked, substantially as described.

8. A pipe hanger stirrup consisting of two hinged members, the one member having a screw passing therethrough, and provided with a nut and having also a beveled or tapering lug formed therewith and inclosing the screw for a portion of its length, and the other member being provided with a hole adapted to receive the said lug, substantially as described.

9. A pipe hanger stirrup consisting of two hinged members, adapted to be closed about a pipe, the hinge which joins said members having a stop so situated as to hold one of the members, when it is moved to open the stirrup, in a position at substantially right angles to the other member substantially as described.

10. A pipe hanger stirrup consisting of two separable hinged members, the hinge which joins said members having a stop so situated as to hold one of the members in a position at substantially right angles to the other member and being so constructed as to prevent disengagement except when one of them is swung to a point intermediate its closed or uppermost and its open or lowermost position, substantially as described.

11. The combination with a jaw having a hole and provided with a bolt forming an integral part thereof, of a second jaw having a screw threaded portion extending through the hole in the jaw, and a nut for the said screw threaded portion, substantially as described.

In testimony whereof I affix my signature in presence of two witnesses.

WILLIAM McILVRID.

Witnesses:
NEWTON R. MARVIN,
CHARLES V. TUTHILL.